United States Patent
Gerresheim et al.

(10) Patent No.: US 6,176,285 B1
(45) Date of Patent: Jan. 23, 2001

(54) PREPARATION FOR THE SEALING OF TIRES WITH PUNCTURES, APPARATUS FOR THE SEALING AND PUMPING UP OF TIRES AND TIRES WITH AN INTEGRATED SEALING PREPARATION

(75) Inventors: Manfred Gerresheim, Obertshausen-Hausen; Hans-Bernd Fuchs, Alzenau-Hörstein; Ulrich Steinbrecht, Ober-Ramstadt, all of (DE)

(73) Assignee: Sumitomo Rubber Industries, Ltd., Hyogo-ken (JP)

( * ) Notice: Under 35 U.S.C. 154(b), the term of this patent shall be extended for 0 days.

(21) Appl. No.: 08/991,489

(22) Filed: Dec. 16, 1997

(51) Int. Cl.[7] .................................................. B60C 23/00
(52) U.S. Cl. .............................................................. 152/509
(58) Field of Search ............................................... 152/509

(56) References Cited

U.S. PATENT DOCUMENTS

| | | | |
|---|---|---|---|
| 2,812,783 | 11/1957 | Bufogle | 141/38 |
| 3,511,294 | 5/1970 | Bepstein et al. | 152/418 |
| 3,690,695 | 9/1972 | Jones, Sr. | 280/741 |
| 3,731,843 | 5/1973 | Anderson, Jr. | 222/3 |
| 3,833,041 | 9/1974 | Glad et al. | 152/509 |
| 3,843,586 | 10/1974 | Wolf | 206/302 |
| 3,860,539 | * 1/1975 | Miyazato | 152/347 |
| 3,942,573 | 3/1976 | Lawrence et al. | 132/503 |
| 4,287,928 | 9/1981 | Hallman | 152/504 |
| 5,178,701 | 1/1993 | Taylo | 152/509 |
| 5,403,417 | 4/1995 | Dudley et al. | 156/97 |

FOREIGN PATENT DOCUMENTS

| | | |
|---|---|---|
| 2725673 | 12/1977 | (DE) . |
| 0278297 | 8/1988 | (EP) . |
| 0753420 A1 | 1/1997 | (EP) . |
| 671659 | 12/1929 | (FR) . |
| 2303678 | 10/1976 | (FR) . |
| 2146959 | 5/1985 | (GB) . |
| 9400289 | 1/1994 | (WO) . |
| WO 96/30716 A1 | 10/1996 | (WO) . |

* cited by examiner

Primary Examiner—Francis J. Lorin
(74) Attorney, Agent, or Firm—Birch, Stewart, Kolasch & Birch, LLP

(57) ABSTRACT

Preparations for the sealing of tires with punctures are proposed, which contain the latex of synthetic isoprene rubbers or the latex of natural rubber together with latexes of synthetic isoprene rubbers, acrylate rubbers and/or methacrylate rubbers. The sealing preparations can contain an adhesive resin compatible with the latexes from the group comprising polyvinyl esters, polyvinyl alcohol and/or polyvinyl pyrrolidone, and also a pigment, with natural rubber latex, synthetic rubber latexes or their mixtures being used as rubber latex. Furthermore, an apparatus is described for the sealing and pumping up of the tire using an airbag inflation charge and also tires with an integrated sealing preparation.

23 Claims, 1 Drawing Sheet

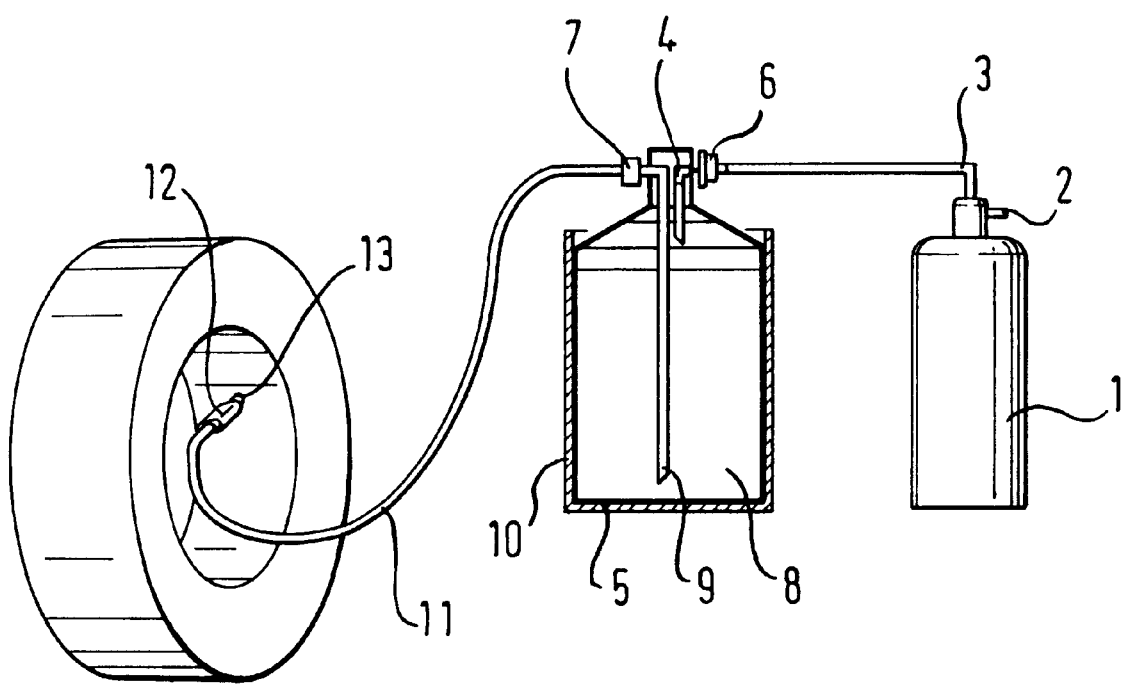

PREPARATION FOR THE SEALING OF TIRES WITH PUNCTURES, APPARATUS FOR THE SEALING AND PUMPING UP OF TIRES AND TIRES WITH AN INTEGRATED SEALING PREPARATION

BACKGROUND OF THE INVENTION

The present invention relates to the use of preparations for example rubber latex for the sealing of tires with punctures, and also to an apparatus for the introduction of a sealing preparation into the tires wherein the tire is pumped up to a pressure at which it can be driven, as well as tires with an integrated sealing preparation.

Various sealing preparations for tire punctures are available on the market. They mainly contain colloidal dispersions of polymers in an aqueous medium, known as latexes. Thus, by way of example, polystyrene-butadiene latexes, polyvinylacetate latexes, acrylic copolymer latexes, nitrile latexes and polychloroprene latexes, are used. Sealing preparations are also known which contain not water but rather tetrachloroethylene as the carrier medium.

For the introduction of the sealing preparation into the tire and for the pumping up of the tire to a pressure at which the tire can be driven, use is made of e.g., a spray can, an apparatus comprising a pressure tight container for the sealing preparation which contains a liquefied gas as the pressure source. Generally, a propane/butane mixture and is used as the liquefied gas, in rarer cases hydrochlorofluorocarbons also are used. Contains such as spray cans have at their outlet valve a hose, in which the other end thereof is provided with a screw adapter for the tire valve.

When a tire puncture arises, the sealing preparation is sprayed from the spray can via the tire valve into the interior of the tire and the tire is pumped up by means of a propellant gas to a specific pressure, which is at different levels, depending upon the leak. The tire is then driven for a few kilometers, depending on the nature of the defect, to distribute the sealing preparation in the interior of the tire and to seal off the defect.

In another apparatus the sealing preparation is located in a compressible flask, which is connected via an adapter to the tire valve from which the valve insert was previously removed. The sealing preparation is then injected into the tire by pressing the flask or bottle. After putting the valve insert in place, the tire is inflated again to a specific pressure with the aid of carbon dioxide cartridges.

The above described sealing preparations are not completely satisfactory. They can be relatively easily removed mechanically and are, in part, not adequately water resistant and do not result in a seal when the tire defect lies in the run out of the under-tread rubber, i.e. in the region between the tread and the side surface of the tire.

Difficulties arise with the apparatus for introducing the sealing preparation into the interior of the tire and for the pumping up of the tire. Thus, spray cans which contain propane/butane mixtures as the propellant gas only operate satisfactorily, depending on the mixing ratio, at temperatures down to about 0° or somewhat below.

In the older German patent application 195 45 935.0, sealing preparations for tire punctures and apparatus for the application of the sealing preparation into the tire are described, which do not have the above named disadvantages. The sealing preparations comprise an agent which contains natural rubber latex, optionally together with additional rubber latexes or a rubber latex in combination with a compatible adhesive resin. Latexes of synthetic rubbers, such as stirene-butadiene rubber, acrylonitrile-butadiene rubber, ethylene vinylacetate rubber, chloroprene rubber, vinyl pyridine rubber, butyl rubber and also their mixtures, are named as rubber latexes which can be used together with natural rubber latex. The same synthetic rubber latexes and also natural rubber latex are quoted as rubber latexes which can be used in combination with an adhesive resin. Resins which have been added as a tackifier to elastomers, such as terpene phenolic resins, can be used as the adhesive resin.

The same patent application describes an apparatus for the sealing and pumping up of tires with punctures, in which a pressure-tight container is provided with an outlet valve for the sealing preparation and with a gas inlet. Furthermore, a pressure source is provided, so that gas under pressure can be introduced into the pressure-tight container via the gas inlet in order to introduce the sealing preparation into the interior of the tire and to pump up the tire.

Furthermore, a heat source for the heating up of the sealing preparation can be provided in the pressure-tight container and/or in the pressure source. Pressurised bottles with liquid or compressed gas and also air compressors are named as a pressure source.

SUMMARY OF THE INVENTION

An object of the present invention is to make available further sealing preparations which result in a better seal under wet conditions and also deals with defects in the run out of the under-tread rubber which are also mechanically more difficult to remove. Furthermore, sealing preparations are to be made available in which the year of manufacture can be determined even after it has been applied into the tire. Moreover, further apparatus should be provided for the application of sealing preparations into the tire and for the pumping up of the tire to a pressure at which it can be driven. Finally, tires with an integrated sealing preparation are proposed.

Starting from the initially named sealing preparation, this object is satisfied by a preparation which contains a latex of synthetic isoprene rubbers. Cis 1,4-, trans 1,4-, 1,2- and 3,4-polyisoprenes can be considered as the synthetic isoprene rubbers. The latex of synthetic cis 1,4-isoprene rubber is preferably used.

The latex or synthetic isoprene rubbers can be used on their own as the rubber latex in the sealing preparation or together with latexes of synthetic rubbers, such as acrylate rubber, methacrylate rubber, stirene-butadiene rubber, acrylonitrile-butadiene rubber, ethylene-vinylacetate rubber, chloroprene rubber, vinyl pyridine rubber, butyl rubber and others, as well as their mixtures. The content of the latex of synthetic isoprene rubber preferably amounts to at least 40% by weight of the total rubber latex, when it is used together with latexes of synthetic rubbers.

A further embodiment of the invention is a sealing preparation on the basis of natural rubber latex which additionally contains latexes of synthetic isoprene rubber, acrylate rubber and/or methacrylate rubber. The content of natural rubber latex amounts to 10 to 80% by weight, in particular to 40 to 60% by weight of the named rubber latex. Preferably preferred are mixtures of natural rubber latex and synthetic isoprene rubber latex or of natural rubber latex and acrylate rubber latex. The sealing preparations on the basis of natural rubber latex can also contain, in addition to synthetic isoprene rubber latex, acrylate rubber latex and/or methacrylate rubber latex one or more of the above named latexes of synthetic rubbers.

Under acrylate rubbers there are to be understood rubber elastomeric vulcanisable copolymers on the basis of acrylic acid esters, in particular ethyl and butyl acrylates and small quantities of comonomers by which reactive groups which favor rapid vulcanisation can be incorporated into the polyacrylate. In the same way methacrylate rubbers are to be understood as rubber elastomeric, vulcanisable copolymers on the basis of methacrylic acid esters, in particular methyl and ethyl methacrylates, and again small quantities of comonomers with reactive groups.

All the above described sealing preparations can preferably, additionally contain an adhesive resin compatible with the rubber latexes. Compatible signifies that the adhesive resin causes no coagulation of the rubber latex. Adhesive resins are to be understood to be resins which enhance the bonding capability of the rubber latex to the tire. For example, resins can be used which have been added as tackifier to elastomers. The adhesive resins are preferably added to the rubber latex in the form of aqueous dispersions or emulsions. As a rule, they are aqueous dispersions. Preferred are terpene phenolic resins. Other preferred adhesive resins are polyvinyl esters, polyvinyl alcohols and polyvinyl pyrrolidones. Preferred polyvinyl esters are resin dispersions based on polyvinyl acetate and polypropionate and copolymeric dispersions of the vinyl acetate with (meth-) acrylic esters, vinyl chloride, maleic acid esters, vinyl laurate and ethylene.

In accordance with a further embodiment of the present invention, the polyvinyl esters, polyvinyl alcohols and polyvinyl pyrrolidones can be contained in all sealing preparations on the basis of rubber latex. As rubber latex, these sealing preparations can contain only natural rubber latex or only synthetic rubber latex or mixtures of natural rubber latex with one or more of the synthetic rubber latexes named above.

In the sealing preparation of the invention, latex which has been deproteinised by centrifugal action or concentrated by evaporation can be used as the natural rubber latex.

Sealing preparations only have a limited durability of a few years. If they are used after the expiration of their useful life, then the danger exists that no adequate seal may be possible. In order to be able to determine in the case of complaints whether sealing preparations were used whose useful life had expired, a further embodiment of the present invention provides for the addition of a pigment for the coloring of the sealing preparation. A differently colored pigment will be added to the sealing preparations for each year of manufacture so that it can be determined with regard to the color of the applied sealing preparation whether the durability limit was exceeded. A whole series of pigment preparations are available commercially for the coloring of rubber latex. These are preparations of organic or inorganic pigments in an aqueous dispersion medium. By way of example green nitrosonaphthol iron complexes and copper phthalocyanine, blue copper phthalocyanines, iron oxide red, carbon black coloring, pyrazolone orange and diarylide yellow can be considered as pigment types.

The sealing preparations of the present invention can be used for the sealing of tires of bicycles, motorcycles, motorcars, commercial vehicles, industrial vehicles, wheelchairs, caravans, garden vehicles, agricultural vehicles, wheel barrows and so on.

In the sealing preparations of the present invention which contain an adhesive resin, the ratio by weight of rubber to adhesive resin lies in a range from about 10:1 to 1:10, preferably 5:1 to 1:3 and particularly preferably from 4:1 to 1:1.

Preferably an antifreeze is added to the sealing preparations of the invention. The customary antifreezes which can be used, have properties such as a high boiling point, are water soluble, and are non-inflammable organic liquids, such as glycols, preferably ethylene glycol. Polyethylene glycols with molecular masses of up to 300 to 400 g/mol can also be used. Through this addition a good seal is also achieved at low temperatures, even when associated with wet effects.

A dispersion agent, as a rule water, can be used to dilute the sealing preparations. Furthermore, the sealing preparations of the invention can contain customary dispersion media, emulsifiers, foam stabilisers and/or pH regulators, such as ammonia or sodium hydroxide. Furthermore, it can be of advantage for a quick sealing and for the sealing of larger holes to use one or more fillers. As fillers silica, chalks, carbon black, fibrous materials such as natural fibers, chemical fibers of natural polymers or synthetic fibers, glass fiber reinforced plastics, styropor (polystyrene) particles, rubber flour obtained by comminution of vulcanised products, such as tires, saw dust, particles of moss rubber, particles of foam for arranging cut flowers and the like can, for example, be considered. Particularly preferred are fibrous materials, rubber flour (rubber dust) in combination with silica and glass fiber reinforced plastics.

The fillers can be directly added to the sealing preparation. However, if the fillers have a size which makes it difficult or impossible to introduce the sealing preparation via the tire valve without changing the valve size, then these fillers are introduced into the tire during fitting of the tire. They then bring about the seal in case of a tire puncture together with the sealing preparation injected into the tire.

The solid component of the sealing preparations of the present invention can amount to 40 to 70% by weight, preferably 45 to 55% by weight and more preferably to about 50% by weight of the sealing preparation.

For the sealing preparation without adhesive resins, the solid component consists essentially of rubber. In the sealing preparation with adhesive rubber the solid component additionally contains the resin in so far as it is a solid resin. Furthermore, the solid component can, if required, include the pigment. The liquid component of the sealing preparation without the adhesive resin consists of the carrier agent [water] for the rubber and optionally further liquid components such as the antifreeze and the dispersion medium added for dilution, preferably water. For the sealing preparation with the adhesive resin the liquid component also includes a dispersion medium, or an emulsifying agent for the adhesive resin, preferably water, provided the adhesive resin is not added in undiluted form and also optionally the liquid adhesive resin.

If fillers are used they are added in a quantity of about 20 to 200 g/l of sealing preparation, preferably 60 to 100 g. The fillers are added to the sealing preparation or are introduced into the tire during fitting.

The production, storage and filling of the sealing preparation of the present invention preferably takes place under nitrogen or noble gases in order to avoid the action of oxygen.

For the sealing preparation of the present invention various devices can be used for introducing the sealing preparation into the tire and for the pumping up of the tire. Thus, the sealing preparation can be used in the initially named spray cans, which contain propane/butane mixtures as the propellant gas. However, other apparatus can also be used, such as described in the older German patent application 195 45 935.0.

In accordance with the present invention an apparatus is proposed for the sealing and pumping up of tires with punctures comprising a pressure-tight container containing the sealing preparation, having an outlet valve for the sealing preparation and a gas inlet, and a pressure source which can be connected to the gas inlet to introduce gas under pressure into the pressure tight container for the introduction of the sealing preparation into the interior of the tire and for the pumping up of the tire, with the pressure source being a cartridge containing an airbag inflation charge. The airbag inflation charges presently used are mainly made of solid charges which consist of a mixture of sodium azide, potassium nitrate and silicon dioxide. The triggering of this mixture leads to the generation of nitrogen gas and to the formation of alkali silicates. The liberated nitrogen flows via the gas inlet into the pressure tight container and drives the sealing preparation via the outlet valve and the tire valve connected to it into the interior of the tire. At the same time the tire is pumped up.

The cartridge with the airbag inflation charge can be subdivided into a plurality of chambers, the content of which can be triggered in sequence in order to distribute the gas development over a longer period of time.

A compressed gas charge of air and a little hydrogen can also be contained in the cartridge as the airbag inflation charge. Such airbag inflation charges have been recently proposed.

In order to have sealing devices which are capable of operating correctly at low temperatures, a source of heat is provided, in a preferred embodiment, for warming up the sealing preparation in the pressure tight container. A heat cushion with a resistant heating device can be used as the heat source, with the cushion being wound or placed around the pressure tight container. This heat cushion can also be supplied with current via the cigarette lighter.

Furthermore, the heat source can consist of at least two substances separated from one another which, on being mixed, liberate the heat of reaction such as heat of neutralisation, heat of solution or heat of hydration. Thus, calcium chloride can, if required, be added into a cushion containing water which is wound around the pressure tight container to be heated. Through the heat of hydration the sealing preparation is warmed to a temperature at which it is capable of operating. Naturally, other devices can also be used in place of the cushion, for example an upwardly open vessel with a jacket filled with water into which the pressure tight container to be heated is placed when required.

A latent heat store, which, on conversion, liberates heat, can also be used as the heat source. In this case a cushion can also be considered which contains the latent heat store. Substances can be used as a latent heat store, which develop heat on changes of the state of aggregation or on phase changes. Thus, for example, cushions can be used which contain a sodium acetate solution. On pressing a metal plate, which is likewise contained in the cushion, the sodium acetate crystallizes and the heat of crystallization is liberated.

BRIEF DESCRIPTION OF THE DRAWING

The manner of operation of the apparatus will be explained in more detail with reference to the drawing, which shows a schematic illustration in which the pressure tight container is shown in section.

DETAILED DESCRIPTION OF THE INVENTION

The cartridge 1 with the airbag inflation charge is provided as the pressure source and has as switch 2 in order to trigger the charge. The cartridge 1 is provided with a gas outlet 3, which is connected to the gas inlet 4 at the pressure tight container 5. The gas inlet 4 can be closed by a shut off valve 6. The outlet valve 7 for the sealing preparation 8 is connected to a riser tube 9. Furthermore, the pressure tight container 5 is standing in a vessel 10, the wall of which is filled with water or can be filled with water, to which—if required—calcium chloride can be added in order to heat up the sealing preparation 8. A hose 11 is connected to the outlet valve 7 and carries at its end a screw adapter 12, with which the hose 11 can be screwed onto the tire valve 13.

With a tire puncture the sealing preparation 8 is heated up, if this is necessary at low temperatures by adding calcium chloride into the vessel 10. The screw adapter 12 is screwed onto the tire valve 13 and the outlet valve 7 for the sealing preparation 8 and also the shut off valve 6 at the gas inlet of the pressure tight container are opened. The gas outlet 3 of the cartridge is connected to the gas inlet 6 of the pressure tight container. The ignition of the airbag inflation charge contained in the cartridge 1 is triggered by the switch 2 at the cartridge 1. The gas developed by the ignition flows via the gas inlet 6 into the pressure tight container 5 and presses the sealing preparation through the riser tube 9, outlet valve 7 and tire valve 13 into the tire. Thereafter, the gas developed in the cartridge 1 flows into the interior of the tire and pumps the tire up. Thereafter, the screw adapter can be unscrewed.

Naturally, a vessel which can be filled with water can be dispensed with when the sealing preparation does not freeze at low temperatures because of the addition of antifreeze.

Furthermore, the invention envisages a tire with an integrated sealing preparation. The sealing preparation is filled into a plastic hose, for example of polyethylene. This plastic hose is laid during tire manufacture or tire installation into the well of the rim around the rim. The plastic hose with the sealing preparation is held in the tire well by a surrounding holder of plastic or metal in order to avoid imbalance. Furthermore, a tool is provided in the interior of the tire, for example a lancet knife or needles, in order to open the plastic hose when a tire puncture arises so that the sealing preparation can distribute within the interior of the tire. Moreover, a pressure sensor is arranged in the tire, which, at a specific pressure drop of, for example 0.5 bar, in the tire triggers an electronic or mechanical pulse which actuates the tool for opening the plastic hose for the distribution of the sealing preparation in the tire. The pressure sensor can, for example, trigger a spring mechanism when a predetermined pressure drop arises in the tire, with the spring mechanism allowing the tool to open the plastic hose.

If the defect in the tire does not produce a greater pressure drop than 0.5 bar, prior to the sealing of the tire, then the tire can be driven further and brought to a correct pressure at the next filling station. With a larger defect and a correspondingly greater pressure drop, the tire can be inflated by a gas cartridge or an air compressor connected to the cigarette lighter.

It is also possible to additionally provide a pressure source in the interior of the tire, for example a cartridge with liquefied or compressed gas or an airbag inflation charge, which is likewise opened by the electronic or mechanical pulse triggered by the pressure sensor whereby an outflowing of gas compensates for at least a part of the pressure loss caused by the puncture.

In a further embodiment the plastic hose arranged in the well of the rim is connected to a pressure source. With a specific pressure drop detected by the pressure sensor, an electronic or mechanical pulse is triggered which opens the pressure source so that gas under pressure flows into the plastic hose and allows it to burst. The sealing preparation is then distributed within the tire and seals it. The gas can simultaneously compensate for a part of the pressure drop caused by the puncture.

With a mechanical pressure sensor the pressure source, for example a cartridge filled with liquefied or compressed gas can be opened via a spring mechanism by means of a striker pin. The gases which are preferably used are dinitrogen oxide or sulphur hexafluoride. With an electronic pressure sensor the opening of the pressure source is brought about via an electronic circuit, which opens the pressure source, for example by triggering a cartridge with an airbag inflation charge.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for sealing punctured tires and pumping air into the sealed tires which comprises a pressure-tight container containing a sealing preparation, said container provided with an outlet valve for the sealing preparation and a gas inlet valve, a pressure source for introducing gas under pressure into the pressure-tight container for conveying the sealing preparation from the pressure-tight container into the interior of the tire and for the pumping up the tire said pressure source comprising a cartridge containing an airbag inflation charge with a nitrogen producing mixture.

2. The apparatus of claim 1, wherein a heat source is provided for heating up the sealing preparation.

3. A composition for sealing tire punctures which comprises a natural rubber latex and at least one synthetic latex selected from the group consisting of isoprene rubbers, acrylate rubbers and methacrylate rubbers, said composition being free of a cross-linking agent.

4. The composition of claim 3, wherein the natural rubber latex is present in an amount of 40 to 60% by weight based on the total amount of the rubber latex.

5. The composition of claim 3, wherein the isoprene rubber latex is a cis 1,4-isoprene rubber latex.

6. The composition of claim 3, further containing an adhesive resin compatible with the rubber latexes.

7. The composition of claim 4, wherein the isoprene rubber latex is a cis 1,4-isoprene rubber latex.

8. The composition of claim 4, further containing an adhesive resin compatible with the rubber latexes.

9. The composition of claim 5, further containing an adhesive resin compatible with the rubber latexes.

10. The composition of claim 7, further containing an adhesive resin compatible with the rubber latexes.

11. A composition for sealing tire punctures which comprises a natural rubber latex and at least one adhesive resin compatible with natural rubber latex, said adhesive resin being selected from the group consisting of polyvinyl ester, polyvinyl alcohol and polyvinyl pyrrolidone, said composition being free of a cross-linking agent.

12. The composition of claim 3, which further contains a pigment for coloring the rubber latex.

13. The composition of claim 11, which further contains a pigment for coloring the rubber latex.

14. A vehicle tire mounted on a rim, a synthetic plastic hose disposed in a well around the tire rim, said synthetic hose containing a sealing preparation of natural rubber latex and at least one synthetic latex selected from the group consisting of isoprene rubbers, acrylate rubbers and methacrylate rubbers, a tool for opening the synthetic hose and a pressure sensor, said tool and said pressure sensor being operatively associated with said synthetic plastic hose whereby the occurrence of a specific pressure drop in the vehicle tire sensed by the pressure sensor triggers an electronic or mechanical pulse which actuates the tool to open the synthetic plastic hose for the distribution of the sealing preparation into the tire.

15. The vehicle tire of claim 14, which additionally contains a pressure source which is opened by the electronic or mechanical pulse triggered by the pressure sensor for producing an outflow of gas under pressure.

16. The vehicle tire of claim 15, wherein the pressure source is a cartridge containing liquefied or compressed gas.

17. The vehicle tire of claim 14, wherein the sealing preparation contains a natural rubber latex in an amount of 40 to 60% by weight based on the total amount of rubber.

18. The vehicle tire of claim 14, wherein the sealing preparation further contains at least one adhesive resin selected from the group consisting of polyvinyl ester, polyvinyl alcohol and polyvinyl pyrrolidone.

19. The vehicle tire of claim 14, wherein the sealing preparation contains isoprene rubber as the synthetic rubber latex.

20. A vehicle tire mounted on a rim, a synthetic plastic hose disposed in a well around the tire rim, said synthetic hose containing a sealing preparation of natural rubber latex and at least one synthetic latex selected from the group consisting of isoprene rubbers, acrylate rubbers and methacrylate rubbers, a pressure source being connected to said synthetic plastic hose and pressure sensor being operatively associated with said pressure source whereby the occurrence of a specific pressure drop in the vehicle tire sensed by the pressure sensor triggers an electronic or mechanical pulse which opens the pressure source for the outflow of pressurized gas into the synthetic plastic hose and rupturing the synthetic plastic hose.

21. A vehicle tire mounted on a rim, a synthetic plastic hose disposed in a well around the tire rim, said synthetic hose containing a sealing preparation of natural rubber latex and at least one adhesive resin selected from the group consisting of polyvinyl ester, polyvinyl alcohol and polyvinyl pyrrolidone, a tool for opening the synthetic hose and a pressure sensor, said tool and said pressure sensor being operatively associated with said synthetic plastic hose whereby the occurrence of a specific pressure drop in the vehicle tire sensed by the pressure sensor triggers an electronic or mechanical pulse which actuates the tool to open the synthetic plastic hose for the distribution of the sealing preparation into the tire.

22. A composition for sealing tire punctures, consisting essentially of:

a nutural rubber latex and at least one synthetic latex selected from the group consisting of isoprene rubbers, acrylate rubbers and methacrylate rubbers.

23. A composition for sealing tire punctures consisting essentially of:

a nutural rubber latex and at least one adhesive resin compatible with natural rubber latex, said adhesive resin being selected from the group consisting of polyvinyl ester, polyvinyl alcohol and polyvinyl pyrrolidone.

* * * * *

UNITED STATES PATENT AND TRADEMARK OFFICE
CERTIFICATE OF CORRECTION

PATENT NO. : 6,176,285 B1  Page 1 of 1
DATED : Jaunuary 23, 2001
INVENTOR(S) : Manfred Gerresheim et al.

It is certified that error appears in the above-identified patent and that said Letters Patent is hereby corrected as shown below:

Please insert category "[30] Foreign Application Priority Data" as follows:

-- [30] Foreign Application Priority Data
  December 17, 1996  [DE]  Germany .................. 19652546.2 --.

Signed and Sealed this

Twenty-fifth Day of December, 2001

Attest:

Attesting Officer

JAMES E. ROGAN
*Director of the United States Patent and Trademark Office*